(12) United States Patent
Tachibana et al.

(10) Patent No.: US 9,676,400 B2
(45) Date of Patent: Jun. 13, 2017

(54) GUIDE DEVICE FOR RAIL-GUIDED VEHICLE, AND RAIL-GUIDED VEHICLE

(71) Applicant: KAWASAKI JUKOGYO KABUSHIKI KAISHA, Kobe-shi, Hyogo (JP)

(72) Inventors: Masaru Tachibana, Kobe (JP); Akihiro Niizeki, Kobe (JP); Junji Kamatani, Kobe (JP); Akira Komoto, Amagasaki (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 146 days.

(21) Appl. No.: 14/774,549

(22) PCT Filed: Mar. 5, 2014

(86) PCT No.: PCT/JP2014/055649
§ 371 (c)(1),
(2) Date: Sep. 10, 2015

(87) PCT Pub. No.: WO2014/141971
PCT Pub. Date: Sep. 18, 2014

(65) Prior Publication Data
US 2016/0023671 A1    Jan. 28, 2016

(30) Foreign Application Priority Data
Mar. 11, 2013  (JP) .................................. 2013-048213

(51) Int. Cl.
*B61F 9/00*  (2006.01)
*B61B 13/00* (2006.01)
(Continued)

(52) U.S. Cl.
CPC ................ *B61F 9/00* (2013.01); *B61B 13/00* (2013.01); *B61F 5/38* (2013.01); *B62D 1/265* (2013.01)

(58) Field of Classification Search
CPC .... B61F 5/38; B61F 9/00; B61F 9/005; B61B 13/00; B62D 1/265
See application file for complete search history.

(56) References Cited

U.S. PATENT DOCUMENTS

| 9,452,763 B2* | 9/2016 | Maeyama | ............. B62D 1/265 |
| 2005/0139117 A1* | 6/2005 | Ralph | .................... B62D 1/265 |
| | | | 105/168 |

(Continued)

FOREIGN PATENT DOCUMENTS

| CN | 1429726 A | 7/2003 |
| JP | S48-080211 U1 | 10/1973 |

(Continued)

OTHER PUBLICATIONS

Oct. 6, 2016 Extended Search Report issued in European Patent Application No. 14763218.6.

(Continued)

*Primary Examiner* — Jason C Smith
(74) *Attorney, Agent, or Firm* — Oliff PLC (57) ABSTRACT

Provided is a guide device for a rail-guided vehicle that is guided to travel along a travel track, the guide device including: guide wheels that roll in contact with guide rails arranged on both sides of the travel track; steering arms that steer the vehicle; guide wheel support members; and shock-absorbing members. One end of each guide wheel support member is supported at the tip end of a steering arm with shock-absorbing members interposed therebetween, and the other end of each guide wheel support member rollably supports a main guide wheel and a diverging guide wheel. The shock-absorbing members are disposed between each (Continued)

guide wheel support member and the corresponding steering arm, and mitigate the impact load transmitted from the guide wheels to the steering arms.

5 Claims, 6 Drawing Sheets (51) Int. Cl.
B62D 1/26 (2006.01)
B61F 5/38 (2006.01)

(56) References Cited

U.S. PATENT DOCUMENTS

| | | | | |
|---|---|---|---|---|
| 2007/0113754 | A1* | 5/2007 | Andreasson | E01B 25/00 |
| | | | | 104/242 |
| 2010/0294164 | A1* | 11/2010 | Oku | B61D 13/00 |
| | | | | 105/182.1 |
| 2012/0103227 | A1* | 5/2012 | Maeyama | B61B 13/00 |
| | | | | 104/245 |
| 2013/0068126 | A1* | 3/2013 | Moon | B61F 9/00 |
| | | | | 105/157.1 |
| 2015/0353104 | A1* | 12/2015 | Maeyama | B61B 13/00 |
| | | | | 701/19 |
| 2016/0052529 | A1* | 2/2016 | Tachibana | B61B 13/00 |
| | | | | 105/215.1 |
| 2016/0207548 | A1* | 7/2016 | Katahira | B61B 13/00 |
| 2016/0264156 | A1* | 9/2016 | Yanobu | B61B 13/04 |
| 2016/0272222 | A1* | 9/2016 | Katahira | B61B 13/00 |
| 2016/0355059 | A1* | 12/2016 | Katahira | B61F 9/00 |

FOREIGN PATENT DOCUMENTS

| | | |
|---|---|---|
| JP | S61163054 A | 7/1986 |
| JP | 2004122806 A | 4/2004 |
| JP | 3688461 B2 | 8/2005 |
| JP | 2008-265569 A | 11/2008 |
| JP | 2010158941 A | 7/2010 |
| JP | 2010158942 A | 7/2010 |
| JP | 2011088512 A | 5/2011 |

OTHER PUBLICATIONS

Jun. 3, 2014 International Search Report issued in International Application No. PCT/JP2014/055649.

* cited by examiner

GUIDE DEVICE FOR RAIL-GUIDED VEHICLE, AND RAIL-GUIDED VEHICLE

TECHNICAL FIELD

The present invention relates to a guide device for a guide rail-type vehicle that travels on a travel track while guide wheels are abutted on guiding rails arranged on both sides of the travel track for example, and a guide rail-type vehicle including the guide device.

BACKGROUND ART

Figure 7:
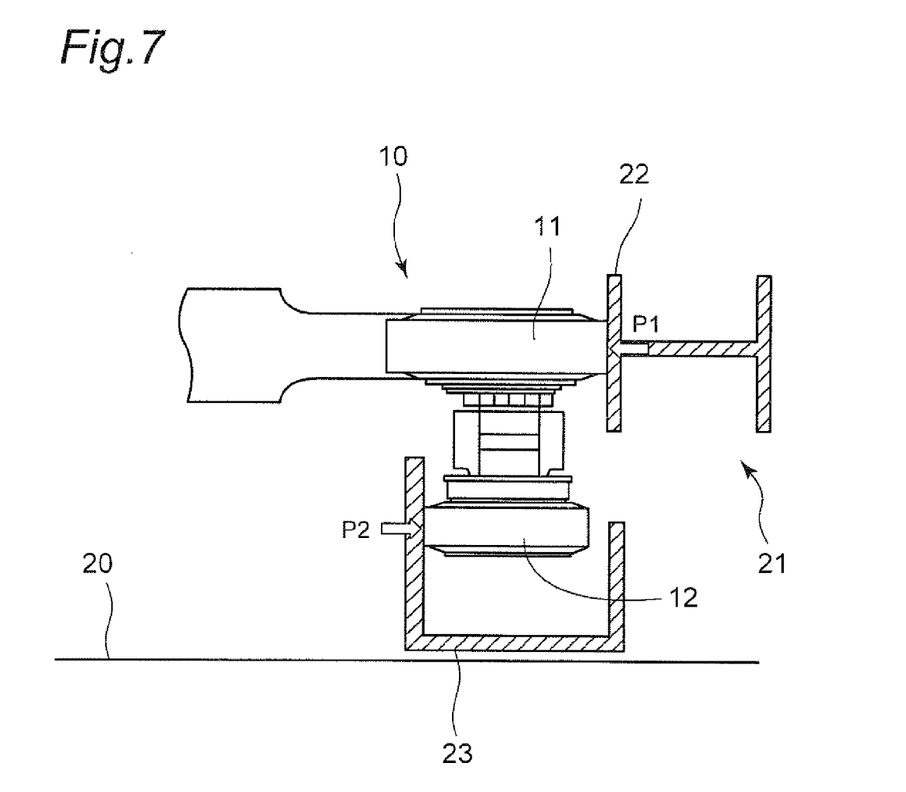
FIG. 7 is a view showing a guide device and a guide rail in a general guide rail-type vehicle.

There is a transit system generally called a new transport system in which a vehicle travels on a preliminarily set travel track. In this transit system, a guide rail-type vehicle that travels by using rubber tires while guide wheels are abutted on guiding rails arranged on both sides of a travel track is provided with guide devices for steering the vehicle. The guide devices are provided on both left and right sides in the vehicle width direction at front and rear parts of a vehicle body. Each of the guide devices includes a guide wheel 10 as shown in FIG. 7. The guide wheels 10 are rotatably provided at ends of guide arms in the front and rear parts of the vehicle body, and each of the guide wheels 10 includes a main guide wheel 11 placed on the upper side, and a turnout guide wheel 12 placed on the lower side thereof. The main guide wheel 11 and the turnout guide wheel 12 are rotated respectively independently.

Meanwhile, on both left and right sides of a travel track 20, guide rails 21 to which the guide wheels 10 are abutted are installed. Each of the guide rails 21 includes a main guide rail 22 installed along the travel track 20, and a diverging guide rail 23 installed at a diverging point of the travel track 20.

Each main guide rail 22 is brought into contact with the main guide wheel 11 from an outer side of the vehicle body and applies inward force P1 toward an inner side of the vehicle body to the vehicle body. Meanwhile, the diverging guide rail 23 is brought into contact with the turnout guide wheel 12 from the inner side of the vehicle body and applies outward force P2 toward the outer side of the vehicle body to the vehicle body. In such a way, while the guide wheels 10 and the guide rails 21 are abutted with each other, the vehicle is guided along the travel track 20 to travel.

Since the guide rail-type vehicle is steered by the guide wheels 10 as described above, the forces P1, P2 upon abutment between the guide wheels 10 and the guide rails 21 act on the vehicle body. Therefore, an excessive action of the inward force P1 and the outward force P2, that is, an action of an impact load invites shorter life of the guide device, generation of noises, a lowered quality of ride, and the like. Thus, in the guide device, a shock-absorbing device that mitigates the inward force P1 and the outward force P2 is provided (for example, Patent Documents 1 to 3).

PRIOR ART DOCUMENTS

Patent Documents

Patent Document 1: Japanese Patent No. JP 3688461
Patent Document 2: Japanese Patent Laid-open Publication No. JP 2011-88512
Patent Document 3: Japanese Patent Laid-open Publication No. JP 2010-158941

SUMMARY OF THE INVENTION

Problems to be Solved by the Invention

As the above shock-absorbing device, for example the Patent Document 1 discloses a structure including an L-shape lever, and a shock-absorbing elastic member. One end of the L-shape lever is turnably attached to a tip end of the above guide arm via a support shaft, and supported via the shock-absorbing elastic member. The above main guide wheel 11 and the turnout guide wheel 12 are rotatably attached to the other end of the L-shape lever. Therefore, when the main guide wheel 11 and the turnout guide wheel 12 are rolled in contact with the main guide rail 22 and the diverging guide rail 23 as described above, the L-shape lever is turned about the support shaft on the one end part thereof. At this time, part of force relating to this turn (corresponding to the forces P1, P2 described above) is absorbed by the shock-absorbing elastic member, and excessive inward force P1 and excessive outward force P2 are suppressed from acting on the vehicle body.

However, in the shock-absorbing device disclosed in the Patent Document 1, the guide arm further has the L-shape lever and the shock-absorbing elastic member as described above. Thus, the structure of the guide arm is complicated and the number of parts is increased. Therefore, there is a problem that a maintenance property is not favorable.

The Patent Document 2 also discloses a similar structure to the above configuration of the Patent Document 1, and discloses the structure including a tabular guide link, and a shock-absorbing rubber or a shock-absorbing mechanism. The guide link corresponds to the L-shape lever of the Patent Document 1, and the shock-absorbing rubber or the shock-absorbing mechanism corresponds to the shock-absorbing elastic member of the Patent Document 1. The guide link and the shock-absorbing rubber or the shock-absorbing mechanism act in a similar way to the L-shape lever and the shock-absorbing elastic member.

Therefore, even in the shock-absorbing device of the Patent Document 2, the structure thereof is complicated and the number of parts is high, and there is a problem that the maintenance property is not favorable.

The Patent Document 3 discloses a configuration that a shock-absorbing device is provided in the above main guide wheel 11 and the turnout guide wheel 12. As described above, the main guide wheel 11 and the turnout guide wheel 12 are rotatably supported on a wheel shaft of the guide arm via bearings. The shock-absorbing device of the Patent Document 3 has a structure in which shock-absorbing members are placed between the wheel shaft and the bearings.

By the shock-absorbing members arranged in such a way, part of the above inward force P1 acting on the main guide wheel 11 and part the above outward force P2 acting on the turnout guide wheel 12 are absorbed, so that excessive force P1 and excessive force P2 are suppressed from acting on the vehicle body.

In the shock-absorbing device of the Patent Document 3 with such configuration, the shock-absorbing member is provided in each of the main guide wheel 11 and the turnout guide wheel 12. Thus, there is a problem that manufacturing cost is increased. In the turnout guide wheel 12 placed on the lower side, there is a problem that an anti-drop measure for a case where the shock-absorbing member installed in the turnout guide wheel 12 is detached is required.

The present invention is achieved in order to solve the above-described problems, and an object of the present invention is to provide a guide device for a guide rail-type vehicle including a simple structure in comparison to the conventional examples with which maintenance is easily performed, and a guide rail-type vehicle including the guide device.

Solutions to the Problems

In order to achieve the above object, the present invention is configured as follows.

That is, a guide device for a guide rail-type vehicle in a first aspect of the present invention is a guide device for a guide rail-type vehicle traveling along a travel track while being guided along the travel track, comprising:

guide wheels rolled by coming in contact with guide rails including main guide rails and diverging guide rails arranged on both sides of the travel track, each of the guide wheels including a main guide wheel and a turnout guide wheel, each of the main guide rails applying inward force toward an inner side of the guide rail-type vehicle to the main guide wheel, and each of the diverging guide rails applying outward force toward an outer side of the guide rail-type vehicle to the turnout guide wheel;

steering arms displaced upon receiving the inward force or the outward force and steer the vehicle;

a guide wheel support member;

a cushioning member;

the guide wheel support member extending in a vehicle longitudinal direction, one end of the guide wheel support member being supported on a tip end of each of the steering arms via the cushioning member, the other end of the guide wheel support member rollably supporting the main guide wheel and the turnout guide wheel, and the cushioning member being a member provided between the guide wheel support member and the tip end of each steering arm, the member transmitting the inward force, the outward force, up-down force making the guide wheel support member displace in a vertical direction, and front-rear force making the guide wheel support member displace in the vehicle longitudinal direction to each steering arm while absorbing the inward force, the outward force, the up-down force, and the front-rear force so as to mitigate an impact load.

The guide wheel support member rollably supporting the main guide wheel and the turnout guide wheel is supported on the tip end of each steering arm via the cushioning member. Thus, force applied to the guide wheel by the guide rails is absorbed by deformation of the cushioning member, so that a buffering action is performed. As mentioned above, the structure in which the guide wheel support member and the cushioning member are used is a simple structure in comparison to the conventional examples with which maintenance is easily performed. Due to the simple structure, manufacturing cost can also be reduced.

A guide rail-type vehicle in a second aspect of the present invention includes the guide device in the first aspect, wherein the guide wheels included in the guide device are rolled by coming in contact with guide rails arranged on both sides of the travel track, so that the steering arms included in the guide device are steered and the guide rail-type vehicle travels along the travel track.

Effects of the Invention

According to the guide device for the guide rail-type vehicle in the first aspect and the guide rail-type vehicle in the second aspect of the present invention, the guide device for the guide rail-type vehicle including a simple structure in comparison to the conventional examples at inexpensive manufacturing cost with which maintenance is easily performed can be provided, and the guide rail-type vehicle including the guide device can be provided.

EMBODIMENTS OF THE INVENTION

Hereinafter, a guide device for a guide rail-type vehicle in an embodiment, and a guide rail-type vehicle including the guide device will be described with reference to the drawings. It should be noted that in the figures, the same or similar constituent parts will be given the same reference signs. In order to avoid unnecessarily redundant description and facilitate understanding of those skilled in the art, detailed description of the already well-known matters and duplicated description of the substantially same configurations will sometimes be omitted. Contents of the following description and the accompanying drawings do not intend to limit the scope described in the claims.

Figure 6:
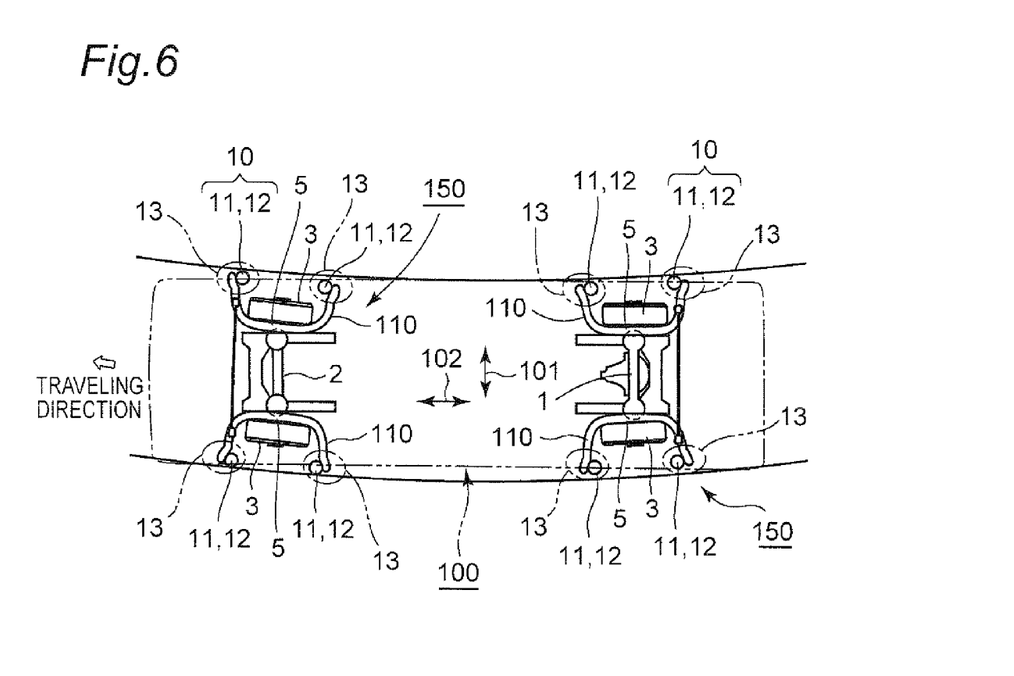
FIG. 6 is a plan view showing a schematic configuration of a guide rail-type vehicle in the embodiment.

Firstly, with reference to FIG. 6, a guide rail-type vehicle 100 in the present embodiment, and guide devices 150 provided in the vehicle 100 will be schematically described. It should be noted that a reference sign 101 denotes a vehicle width direction of the vehicle 100, a reference sign 102 denotes a vehicle longitudinal direction, and a reference sign 103 denotes a vertical direction. The vehicle width direction 101, the vehicle longitudinal direction 102, and the vertical direction 103 are orthogonal to each other.

In the guide rail-type vehicle 100, an axle 1 corresponds to a drive shaft and an axle 2 corresponds to a driven shaft. The axle 1 is coupled to a drive mechanism and is driven and rotated. Travel wheels 3 of rubber tires are turnably supported on a perpendicular plane on both ends of the axle 1 and the axle 2 via bearing portions 5. A steering arm 110 formed in a U-shape in a plan view is attached to each of the bearing portions 5 so as to surround the travel wheel 3. At each of tip ends of one steering arm 110 in respective steering arms 110, a guide wheel 10 including a main guide wheel 11 and a turnout guide wheel 12 is turnably attached to the tip end. As already described, when main guide rails 22 installed along a travel track 20 are abutted on the main guide wheels 11, inward force P1 acts on the main guide wheels 11, and when diverging guide rails 23 are abutted on the turnout guide wheels 12, outward force P2 acts on the turnout guide wheels 12. By the inward force P1 and the outward force P2, the steering arms 110, the bearing portions 5, and the travel wheels 3 are integrally turned about kingpins, so that the vehicle 100 is guided and steered.

It should be noted that a group of each tip end of the steering arm 110, the guide wheel 10 on each tip end of the steering arm 110, and an attachment part 13 of the guide wheel 10 on each tip end of the steering arm 110 corresponds to the guide device 150. The guide device 150 will be described in detail below.

Figure 1:
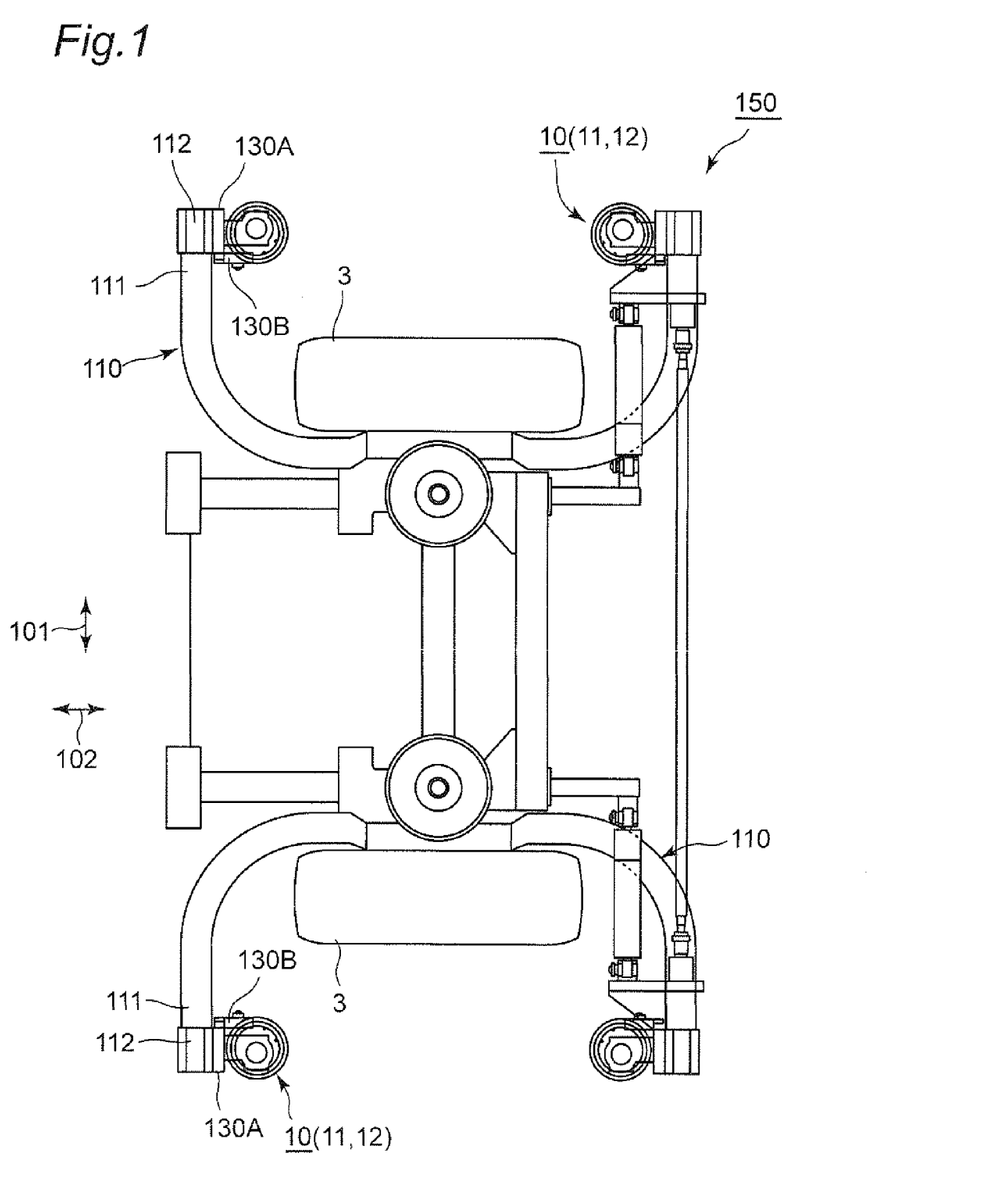
FIG. 1 is a plan view showing a configuration of a guide device in an embodiment.
Figure 2:
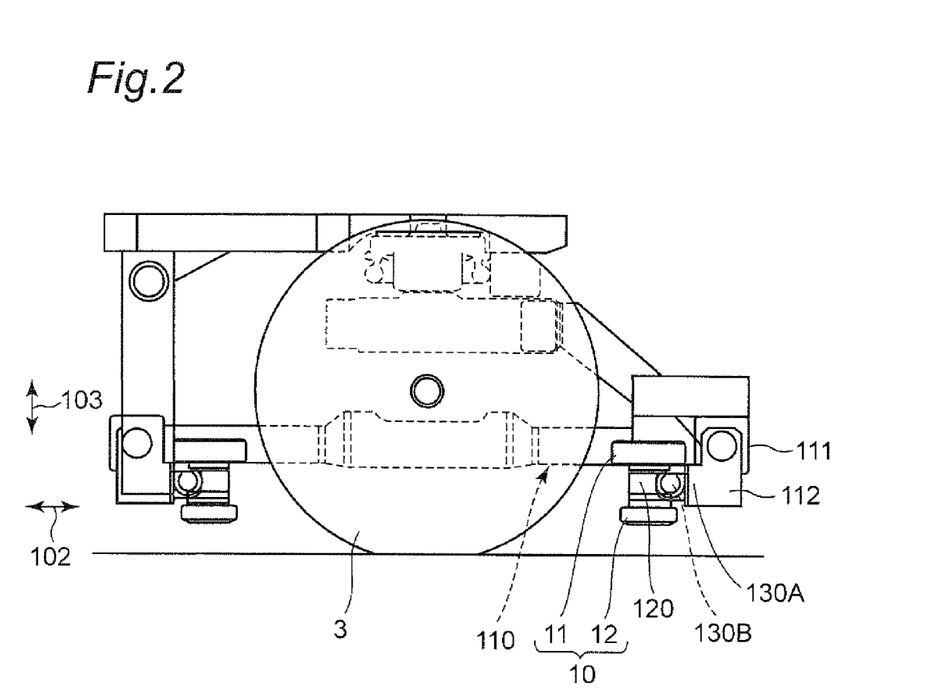
FIG. 2 is a side view of the guide device shown in FIG. 1.

The guide device 150 will be described in detail with reference to FIGS. 1 to 5. It should be noted that FIG. 1 is a plan view in which the axle 2 of the driven shaft shown in FIG. 6 is enlarged. Hereinafter, the axle 2 will be described below. However, the axle 1 of the drive shaft has similar configuration.

In the present embodiment, the guide device 150 includes the steering arm 110, the guide wheel 10 including the main guide wheel 11 and the turnout guide wheel 12, and a guide wheel support member 120 (FIGS. 2, 3A, and 3B) and a cushioning member 130 as a basic configuration. The guide device 150 can further include a coupling member 140.

The steering arm 110 and the guide wheel 10 including the main guide wheel 11 and the turnout guide wheel 12 are described above. Hereinafter, the guide wheel support member 120, the cushioning member 130, and the coupling member 140 will be mainly described.

Firstly, the cushioning member 130 will be described.

The cushioning member 130 is provided between the steering arm 110 and the guide wheel support member 120, and absorbs the inward force P1, the outward force P2, up-down force P3 (FIG. 3B) to displace the guide wheel support member 120 in the vertical direction 103, and front-rear force P4 (FIG. 3A) to displace the guide wheel support member 120 in the vehicle longitudinal direction 102 and mitigates an impact load to the steering arm 110. The cushioning member 130 includes a main cushioning member 130A and an assistant cushioning member 130B. The main cushioning member 130A absorbs the inward force P1, the outward force P2, and the up-down force P3. The assistant cushioning member 130B absorbs the front-rear force P4.

Figure 3A:
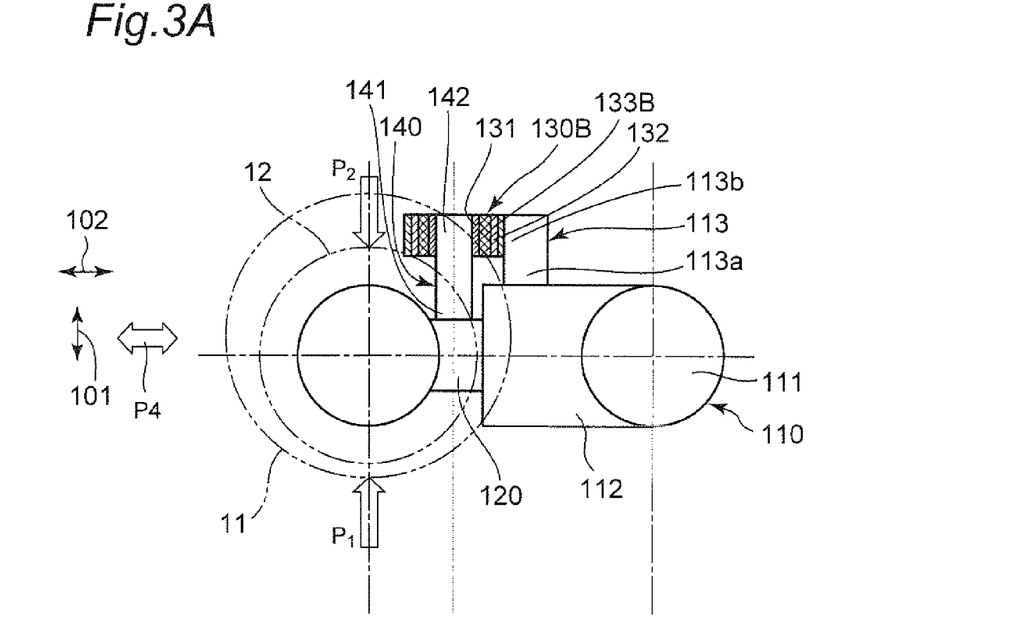
FIG. 3A is a plan view showing a tip end part of a steering arm provided in the guide device shown in FIG. 1.
Figure 3B:
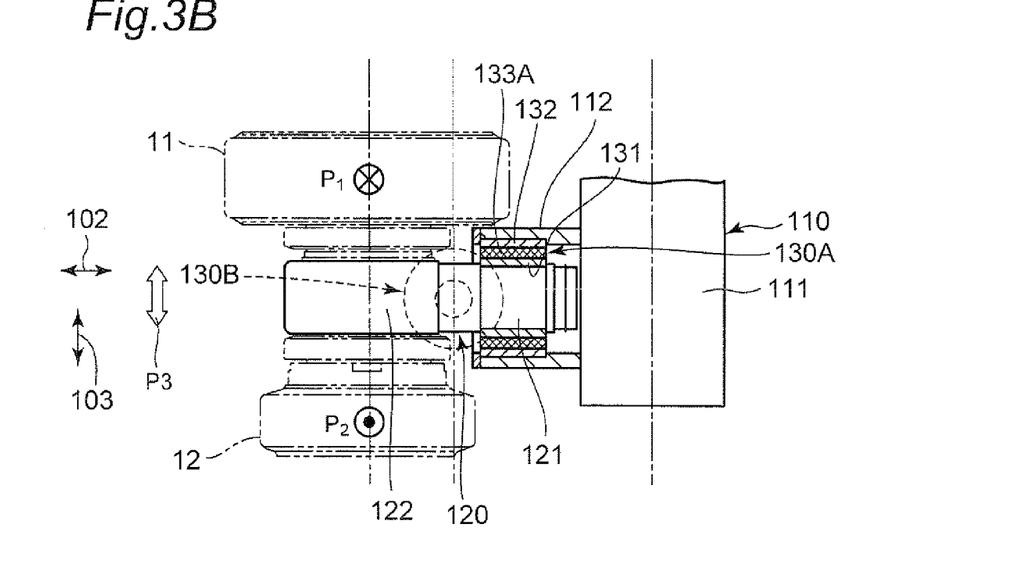
FIG. 3B is a side view of the tip end part of the steering arm shown in FIG. 3A.
Figure 4:
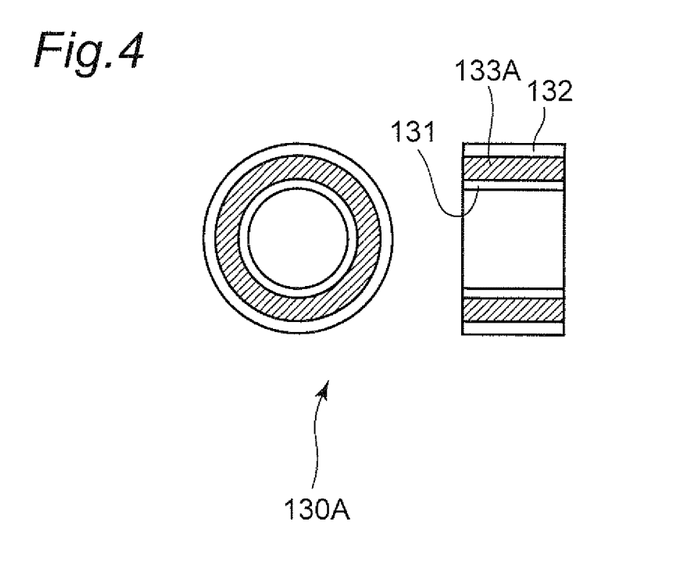
FIG. 4 is a plan view and a sectional view of a main cushioning member shown in FIGS. 3A and 3B.
Figure 5:
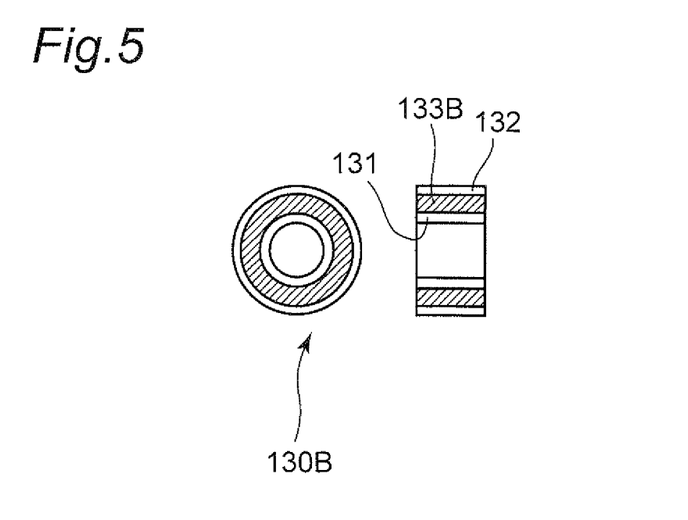
FIG. 5 is a plan view and a sectional view of an assistant cushioning member shown in FIGS. 3A and 3B.

As shown in FIGS. 3 to 5, the main cushioning member 130A and the assistant cushioning member 130B are different in size but have the same configuration, and each of the cushioning members includes an inner ring 131 and an outer ring 132 like a bearing. Between the inner ring 131 and the outer ring 132, as one example of an elastic body, a ring-shape main rubber material 133A is sandwiched in the main cushioning member 130A, and a ring-shape assistant rubber material 133B is sandwiched in the assistant cushioning member 130B, respectively. The main rubber material 133A and the assistant rubber material 133B (sometimes referred to as the "rubber material 133" collectively) perform an action of mitigating or buffering the impact load. A material of the main and assistant cushioning members is not limited to a rubber material but any material capable of achieving functions to be described below can be used.

In the main cushioning member 130A, as one example, an inner diameter of the inner ring 131 is 45 mm, an outer diameter of the outer ring 132 is 85 mm, and length of the main cushioning member 130A is 45 mm. In the assistant cushioning member 130B, as one example, an inner diameter of the inner ring 131 is 25 mm, an outer diameter of the outer ring 132 is 60 mm, and length of the assistant cushioning member 130B is 30 mm. For both the main rubber material 133A and the assistant rubber material 133B, an elastic material capable of mitigating or buffering the impact load can be used. For example, natural rubber and the like can be used.

Next, the guide wheel support member 120 will be described.

The guide wheel support member 120 is a member extending in the vehicle longitudinal direction 102. One end 121 of the guide wheel support member 120 is supported on each of tip ends 111 of the steering arm 110 via the main cushioning member 130A, and the other end 122 of the guide wheel support member 120 rollably supports the main guide wheel 11 and the turnout guide wheel 12. That is, as shown in FIG. 3B, the inner ring 131 of the main cushioning member 130A is fitted on the one end 121 of the guide wheel support member 120, so that the main cushioning member 130A is attached.

Meanwhile, a first support frame 112 is fixed to each tip end 111 of the steering arm 110. As shown in FIG. 3B, the first support frame 112 is a member which is hollow inside, and for example, a pipe material can be used as the first support frame. The first support frame 112 is a member that makes the guide wheel support member 120 extend along the vehicle longitudinal direction 102 and toward a side of the travel wheel 3, and supports the one end 121 of the guide wheel support member 120. As described above, the main cushioning member 130A is attached to the one end 121 of the guide wheel support member 120. Therefore, the outer ring 132 of the main cushioning member 130A is fitted to an inner surface of the first support frame 112. Thereby, the guide wheel support member 120 is supported on the tip end 111 of the steering arm 110 via the main cushioning member 130A and the first support frame 112.

Further, the coupling member 140 will be described.

The coupling member 140 is a member that connects the guide wheel support member 120 to the tip end 111 of the steering arm 110 via the assistant cushioning member 130B. For example, a rod material can be used as the coupling member. As shown in FIG. 3A, one end 141 of the coupling member 140 is fixed to the guide wheel support member 120 and the coupling member 140 extends in the vehicle width direction 101. At the other end 142 of the coupling member 140, the inner ring 131 of the assistant cushioning member 130B is fitted on the other end 142, so that the assistant cushioning member 130B is attached to the other end 142.

Meanwhile, a second support frame 113 is fixed to the tip end 111 of the steering arm 110. It should be noted that in the present embodiment, as shown in FIG. 3A, the second support frame 113 is an L-shape member and one end 113a of the second support frame 113 is connected to the first support frame 112. Thus, the second support frame 113 is fixed to the tip end 111 of the steering arm 110 via the first support frame 112.

At the other end 113b of the second support frame 113, the second support frame 113 supports the other end 142 of the coupling member 140 via the assistant cushioning member 130B. As described above, the assistant cushioning member 130B is attached to the other end 142 of the coupling member 140. The outer ring 132 of the assistant cushioning member 130B is fitted in the second support frame 113. Thereby, the coupling member 140 is supported to the tip end 111 of the steering arm 110 via the assistant cushioning member 130B, and the second support frame 113 and the first support frame 112.

Next, a buffering operation by the assistant cushioning member 130B will be described.

In some cases, the above front-rear force P4 along the vehicle longitudinal direction 102 acts on the main guide wheel 11 and the turnout guide wheel 12 by the main guide rail 22 and the diverging guide rail 23. The front-rear force P4 corresponds to force in a diameter direction of the ring-shape assistant rubber material 133B in the assistant cushioning member 130B. So, the front-rear force P4 becomes force squashing the assistant rubber material 133B. The coupling member 140 extends in the vehicle width direction 101 perpendicular to the front-rear force P4. Therefore, when the front-rear force P4 applies to the coupling member 140 by at least one of the main guide wheel 11 and the turnout guide wheel 12, the assistant rubber material 133B is squashed and deformed so as to perform an action of mitigating the impact load by the front-rear force P4.

In such a way, the assistant cushioning member 130B can mitigate the impact load of the front-rear force P4 applying to the coupling member 140 via the guide wheel support member 120.

Further, in some cases, angular moment is generated to twist the guide wheel support member 120 by the inward force P1 and the outward force P2 applied by the guide wheel 10. Since the force of the angular moment applies to the assistant rubber material 133B via the coupling member 140, the assistant rubber material 133B further performs an action of absorbing the angular moment force. Therefore, the assistant rubber material 133B can also mitigate the impact load by the inward force P1 and the outward force P2.

An operation of the guide devices 150 of the guide rail-type vehicle 100 configured as described above will be briefly described.

As already described, when the vehicle 100 travels on the travel track 20, the main guide rails 22 and the diverging guide rails 23 installed on the travel track 20 are abutted on the main guide wheels 11 and the turnout guide wheels 12 in the guide devices 150. At this time, the inward force P1 acting on the main guide wheels 11, the outward force P2 acting on the turnout guide wheels 12, and the up-down force P3 and the front-rear force P4, both of which might be generated by the above forces P1, P2 in some cases, are buffered by the main cushioning members 130A and the assistant cushioning members 130B, so that generation of noises, a lowered quality of ride, and the like are prevented.

While the operation above is repeated, the vehicle 100 travels along the travel track 20.

The present invention is sufficiently described relating to the preferred embodiment with reference to the accompanying drawings. However, for those skilled in the art, various modifications and corrections are obviously available. It should be understood that such modifications and corrections are included in the scope of the present invention by the accompanying claims unless the modifications and the corrections depart from the scope.

All the disclosed contents of the description, the drawings, the claims, and the abstract of Japanese Patent Application No. JP 2013-48213 filed on Mar. 11, 2013 are incorporated in the present description as a reference.

INDUSTRIAL APPLICABILITY

The present invention can be applied to a guide device for a guide rail-type vehicle that travels on a travel track while guide wheels are abutted on guiding rails, and a guide rail-type vehicle including the guide device.

DESCRIPTION OF REFERENCE SIGNS

10: Guide wheel
11: Main guide wheel
12: Turnout guide wheel
21: Guide rail
22: Main guide rail
23: Diverging guide rail
100: Guide rail-type vehicle
110: Steering arm
112: First support frame
113: Second support frame
120: Guide wheel support member
121: One end
122: Other end
130: Cushioning member
130A: Main cushioning member
130B: Assistant cushioning member
131: Inner ring
132: Outer ring
133: Rubber material
133A: Main rubber material
133B: Assistant rubber material
140: Coupling member
141: One end
142: Other end
150: Guide device

The invention claimed is:

1. A guide device for a guide rail-type vehicle traveling along a travel track while being guided along the travel track, comprising:
    guide wheels rolled by coming in contact with guide rails including main guide rails and diverging guide rails arranged on both sides of the travel track, each of the guide wheels including a main guide wheel and a turnout guide wheel, each of the main guide rails applying inward force toward an inner side of the guide rail-type vehicle to the main guide wheel, and each of the diverging guide rails applying outward force toward an outer side of the guide rail-type vehicle to the turnout guide wheel;
    steering arms displaced upon receiving the inward force or the outward force and steer the vehicle;
    a guide wheel support member;
    a cushioning member;
    the guide wheel support member extending in a vehicle longitudinal direction, one end of the guide wheel support member being supported on a tip end of each of the steering arms via the cushioning member, the other end of the guide wheel support member rollably supporting the main guide wheel and the turnout guide wheel, and
    the cushioning member being a member provided between the guide wheel support member and the tip end of each steering arm, the member transmitting the inward force, the outward force, up-down force making the guide wheel support member displace in a vertical direction, and front-rear force making the guide wheel support member displace in the vehicle longitudinal direction to each steering arm while absorbing the inward force, the outward force, the up-down force, and the front-rear force so as to mitigate an impact load.

2. The guide device for the guide rail-type vehicle according to claim 1, wherein the cushioning member includes a main cushioning member absorbing the inward force, the outward force, and the up-down force, and an assistant cushioning member absorbing the front-rear force.

3. The guide device for the guide rail-type vehicle according to claim 2, further comprising a frame-shape first support frame fixed to the tip end of each steering arm, wherein
    the one end of the guide wheel support member is supported on the inner side of the first support frame via the main cushioning member, and the main cushioning member includes an inner ring fitted on the one end of the guide wheel support member, an outer ring fitted in the first support frame, and a main elastic body sandwiched between the inner ring and the outer ring, the main elastic body absorbing the inward force, the outward force, and the up-down force.

4. The guide device for the guide rail-type vehicle according to claim 2, further comprising:
a frame-shape second support frame fixed to the tip end of each steering arm; and
a coupling member connecting the guide wheel support member to the tip end of each steering arm via the assistant cushioning member, the coupling member extending in a vehicle width direction, and one end of the coupling member being fixed to the guide wheel support member and the other end of the coupling member being supported on the inner side of the second support frame via the assistant cushioning member, wherein
the assistant cushioning member includes an inner ring fitted on the coupling member, an outer ring fitted to the second support frame, and an assistant elastic body sandwiched between the inner ring and the outer ring, the assistant elastic body absorbing the front-rear force and angular moment generated by the outward force and the inward force produced by the guide wheel.

5. A guide rail-type vehicle comprising:
a guide device for a guide rail-type vehicle traveling along a travel track while being guided along the travel track, comprising:
guide wheels rolled by coming in contact with guide rails including main guide rails and diverging guide rails arranged on both sides of the travel track, each of the guide Wheels including a main guide wheel and a turnout guide wheel, each of the main guide rails applying inward force toward an inner side of the guide rail-type vehicle to the main guide wheel, and each of the diverging guide rails applying outward force toward an outer side of the guide rail-type vehicle to the turnout guide wheel;
steering arms displaced upon receiving the inward force or the outward force and steer the vehicle;
a guide wheel support member;
a cushioning member;
the guide wheel support member extending in a vehicle longitudinal direction, one end of the guide wheel support member being supported on a tip end of each of the steering arms via the cushioning member, the other end of the guide wheel support member rollably supporting the main guide wheel and the turnout guide wheel, and
the cushioning member being a member provided between the guide wheel support member and the tip end of each steering arm, the member transmitting the inward force, the outward force, up-down force making the guide wheel support member displace in a vertical direction, and front-rear force making the guide wheel support member displace in the vehicle longitudinal direction to each steering arm while absorbing the inward force, the outward force, the up-down force, and the front-rear force so as to mitigate an impact load, and
the guide wheels included in the guide device being rolled by coming in contact with guide rails arranged on both sides of the travel track, so that the steering arms included in the guide device are steered and the guide rail-type vehicle travels along the travel track.

* * * * *